Feb. 23, 1932.  L. A. SANTIN  1,846,528
HUMAN FORM DELINEATING APPARATUS
Filed Feb. 12, 1929  3 Sheets-Sheet 1
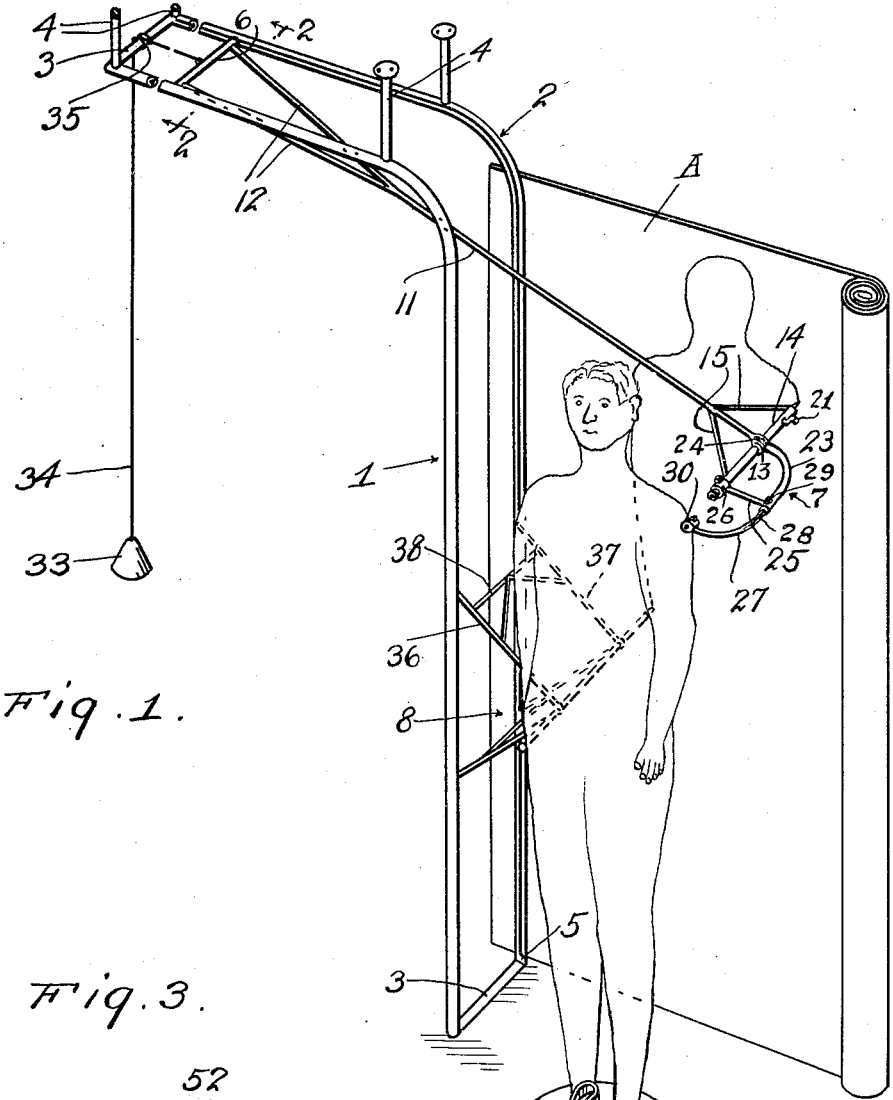
Fig. 1.
Fig. 3.
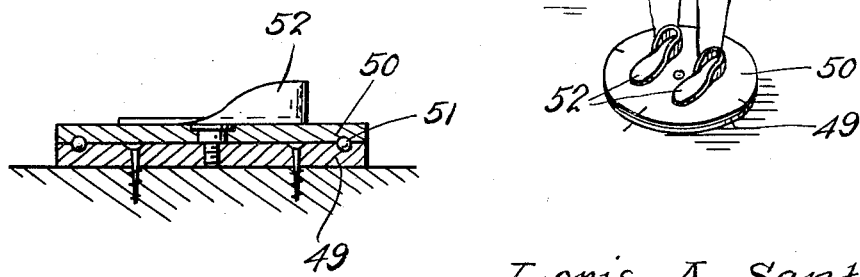
Inventor
Loris A. Santin
By Clarence A. O'Brien
Attorney

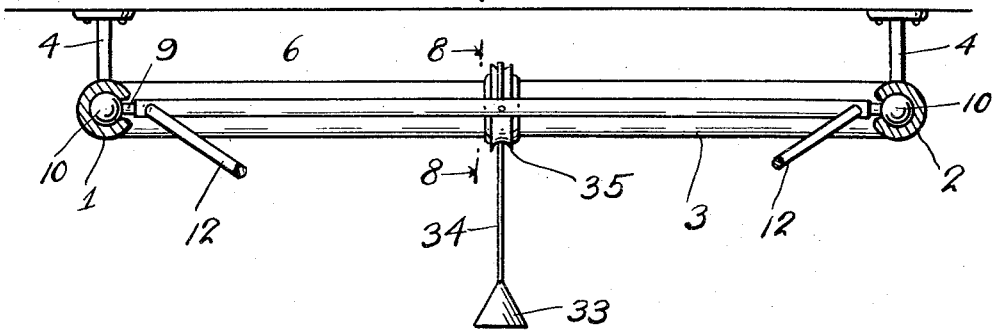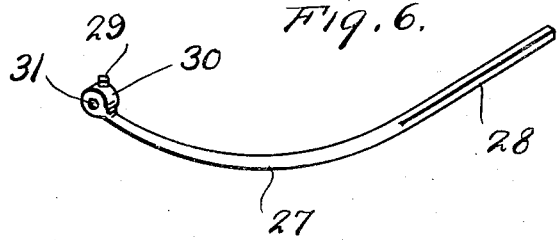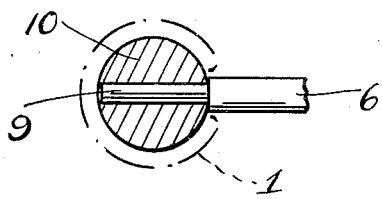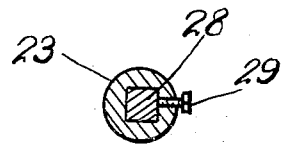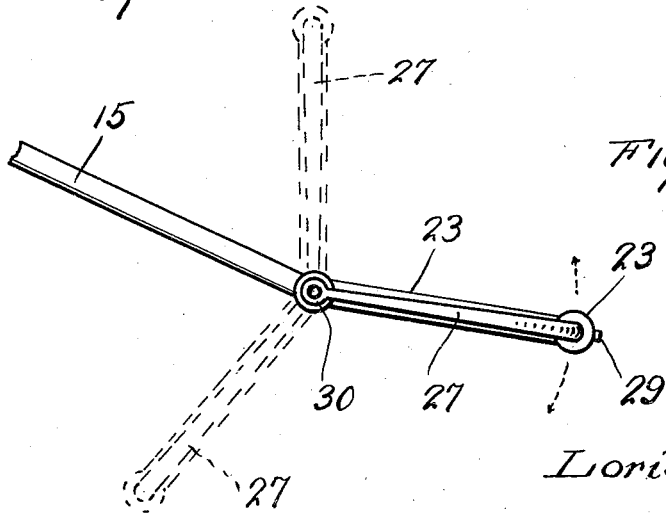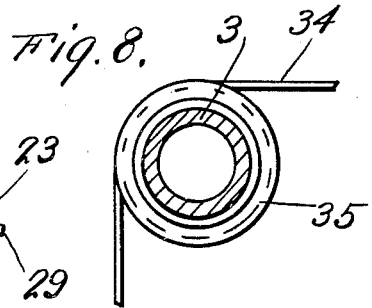

Feb. 23, 1932.        L. A. SANTIN        1,846,528
HUMAN FORM DELINEATING APPARATUS
Filed Feb. 12, 1929        3 Sheets-Sheet 3
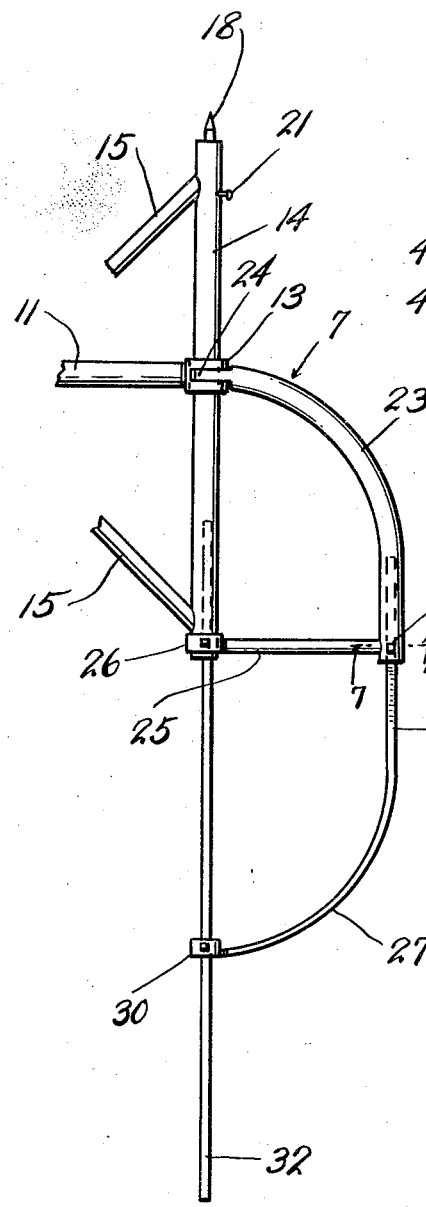
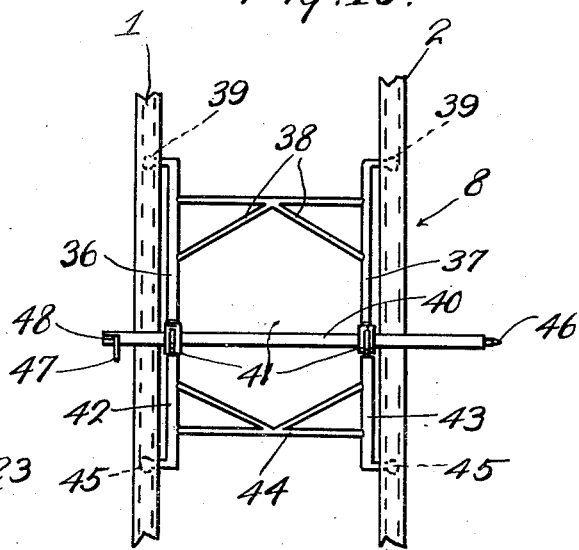
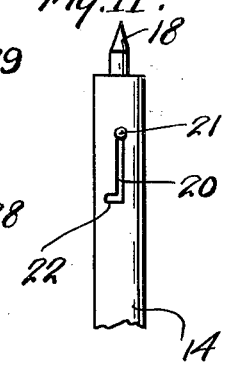
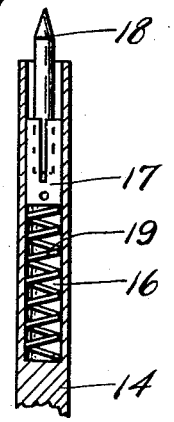
Inventor
Loris A. Santin
By Clarence A. O'Brien
Attorney Patented Feb. 23, 1932

1,846,528

UNITED STATES PATENT OFFICE

LORIS A. SANTIN, OF NEWPORT, WASHINGTON

HUMAN FORM DELINEATING APPARATUS

Application filed February 12, 1929. Serial No. 339,440.

The present invention relates to improvements in measuring instruments and has reference more particularly to a delineating apparatus for drawing the profile of a human form, for the purposes of taking measurements, incident to the cutting of wearing apparel.

One of the important objects of the present invention is to provide a simple and efficient apparatus for graphically recording the contours and dimension characteristics of bodies of the persons to be fitted.

Another important object of the invention is to provide a delineating apparatus of the above mentioned character that will save considerable time and labor and will enable agents taking orders for tailoring concerns on made to measure clothing, to send to the manufacturers a full-sized representation of the body profile of the prospective purchaser.

Another object of the invention is to provide a delineating apparatus of the above mentioned character that includes means for engaging the opposite sides of the human form and simultaneously transferring the exact shape of the body onto a chart, thus insuring accurate measuring.

A still further object of the invention is to provide an apparatus of the above mentioned character that can be readily and easily assembled or disassembled, the same being simple in construction, inexpensive, strong and durable, and well adapted to the purpose for which it is designed.

Other objects of the invention will become apparent as the nature of the invention proceeds and when taken in connection with the accompanying drawings.

In the accompanying drawings, forming a part of this application, and wherein like reference characters designate like parts throughout the several views:

Figure 1 is a perspective view of the apparatus embodying my invention, showing the same in use, Figure 2 is a sectional view taken approximately on the line 2—2 of Figure 1, looking in the direction of the arrow.

Figure 3 is a sectional view through the pedestal, upon which the person whose measurement is to be taken stands.

Figure 4 is a top plan view of the outer surface-engaging and marker-carrying unit.

Figure 5 is an end elevation thereof.

Figure 6 is a detail perspective view of the curved arm forming a part of this unit.

Figure 7 is a sectional view taken approximately on the line 7—7 of Figure 4.

Figure 8 is a sectional view taken on the line 8—8 of Figure 2.

Figure 9 is a sectional view through one of the ball shaped heads arranged on the reduced ends of the horizontally movable cross rod.

Figure 10 is a side elevation of the inner surface engaging and marker carrying unit.

Figure 11 is an end elevation of the outer end of the tubular member showing the pencil projecting therefrom, and the means for moving the pencil inwardly to an inoperative position, and Figure 12 is a sectional view therethrough, showing the means for normally projecting the pencil outwardly to an operative position.

In the drawings, wherein for the purpose of illustration is shown the preferred embodiment of my invention, the numerals 1 and 2 designate a pair of parallel spaced channel shaped tracks respectively, that are interconnected together at their upper and lower ends by suitable cross pieces shown at 3.

These opposed tracks have their upper end portions directed horizontally, while the major portions of the tracks are disposed vertically, and suitable attaching brackets 4 extend upwardly from the horizontal upper end portion of the tracks, and these brackets are adapted to be secured to the ceiling by any appropriate fastening means as suggested very clearly in Figure 2.

Upon referring to Figure 1, it will be observed that the lower end portions of the spaced tracks are formed with the lateral flat sides to facilitate the insertion and removal of the cross bar 6 that forms a part of the outer surface engaging and marker carrying unit, as well as the inner surface engaging and marker carrying unit, denoted generally by the reference characters 7 and 8 respectively.

The horizontally movable cross rod 6, has its respective ends reduced as indicated at 9 (Fig. 2), and a ball shaped head 10 is secured on each reduced end portion for movement within the horizontally disposed portions of the respective tracks as shown in Figure 2.

While I have shown each of the tubular tracks as being substantially C-shaped in design in cross section, it is to be understood that I do not wish to limit myself to the particular shape of these tracks.

The unit 7 includes an elongated arm 11, whose upper end terminates in the diverging portions 12 and these diverging portions are connected at their outer extremities to the cross rod 6, inwardly of the respective ends thereof in a rigid manner.

The other end of this arm 11 is formed with a fork, indicated at 13, and the furcations of this fork are formed with registering openings through which is disposed a bar 14. Suitable braces 15 extend between the outer end portions of this bar 14, and the arm 11.

The outer end of this bar 14 is formed with an elongated socket 16 (Fig. 12), which has movable therein a block 17 for receiving and securing the inner end of a marking pencil 18 and for the purpose of normally projecting the writing end of the pencil beyond the outer end of the socket 16 there is provided within the socket an expansible coil spring 19 that is arranged between the closed inner end of the socket and the adjacent end of the movable block 17.

A bayonet slot 20 is formed in one side of the tubular socket 16, to accommodate the headed pin 21, that is attached at its inner end to the block 17, and this pin is movable in the bayonet slot. When the pin is disposed within the laterally disposed portion 22 of the slot 20, the point of the pencil is maintained in a retracted position within the socket 16 and the coil spring 19 is held under compression as is obvious from the construction disclosed in the drawings. When the pin 21 is released from the laterally disposed portion 22, the spring 19 will automatically move the block 17 outwardly, so as to project the point of the pencil to an operative position.

The other end of the bar 14 is formed with a rectangular shaped socket for a purpose to be hereinafter more fully described.

A curved arm of tubular construction and denoted by the reference character 23 has its inner end flattened and this flattened inner end 24 is formed with an opening to accommodate the bar 14, the flattened inner end portion 24 being disposed between the furcations of the forked end of the arm 11, and this curved arm 23 is capable of swinging movement in a vertical plane.

The bore of the tubular curved arm 23 is of rectangular configuration. A rod 25 extends laterally from the free end portion of curved arm 23, and a sleeve 26 is carried by the outer end of the rod for disposition over the inner end portion of bar 14, whereby to provide a brace for the outer end portion of the curved arms 23. A curved rod 27 has its inner end portion of rectangular shape in cross section to form a shank 28 that is adjustably secured within the outer end portion of the curved arm 23, by means of the set screw 29, as indicated in Figure 7. The outer end of this curved rod 27 terminates in a surface engaging head 30 that is formed with a transverse bore 31, disposed in alignment with the bar 14.

An elongated rod 32 is removably secured at its inner end within the inner end of the bar 14, and is slidable through the bore 31, and may be adjustably secured in position for the purpose of taking measurements of a person having relatively broad shoulders and where the surface engaging head 30 cannot properly function, in order to obtain the exact delineation. However, when the surface engaging head 30 can be properly employed, the rod 32 is removed from the unit 7, as shown in Figure 1.

The arm 11 is capable of vertical swinging movement between the spaced tracks 1 and 2 and the unit 7 is used for obtaining measurements of the outer side of the body. A counter-weight 33 is attached to the cross bar 6, by a cable 34, and is disposed around the uppermost connecting member 3, for the purpose of normally maintaining the cross bar 6, in its rearwardmost position. A suitable pulley 35 is arranged on the upper connecting member 3, for the cable 34, as clearly shown in Figure 8. The inner surface engaging and marker carrying unit 8 includes a pair of spaced rods 36 and 27, that are interconnected together by the means shown generally at 38, in Figure 10. The upper ends of these rods 36 are disposed laterally and ball shaped heads 39 are carried by the laterally disposed upper ends of the rods for disposition within the vertical portions of the respective tracks. The lower ends of these spaced rods are forked and a tubular bar 40 extends transversely through aligned openings formed in the furcations of these forks 41, as clearly indicated in Figure 10.

The unit 8 further includes a shorter pair of parallel spaced rods denoted by the reference characters 42 and 43 respectively, the same being interconnected together by the bracing means 44.

The upper ends of the shorter arms 42 and 43 are reduced and flattened for disposition within the forked lower extremity 41 of the rods 36 and 37 respectively, and the reduced upper ends of the shorter arms are formed with openings through which the tubular bar 40 projects. This tubular bar provides a hinged connection between the adjacent ends of the pairs of rods. The lower ends of the rods 42 and 43 are disposed laterally and are formed with ball shaped heads 45, that are also arranged for movement within the respective tracks. By moving the upper and lower pairs of rods toward each other, the marker carrying bar 40 is disposed further away from the tracks 1 and 2, and manifestly by separating the upper and lower pairs of rods so that the inner adjacent ends of the rods move inwardly toward the tracks, the marker carrying bar will also be caused to move inwardly toward the tracks.

A pencil carrying member is arranged for longitudinal slidable movement through the tubular bar 40, the pencil carried by one end of this member being shown at 46. An actuating handle 47 is associated with the other end of the member that carries the pencil, and the inner end of the tubular bar 40 is formed with a slot 48 to accommodate the handle portion 47 and by retracting the handle 47, the pencil 46 may be moved inwardly to an inoperative position.

A spring structure may be arranged within the tubular bar 44 for cooperation with the pencil carrying member in order to normally project the pencil 46 to an operative position.

My improved delineating apparatus includes the provision of a base 49 that is fixedly secured to the floor adjacent the lower ends of the tracks, and arranged for rotation on the upper face of the stationary base 49 is the pedestal 50. Suitable ball bearings 51 are interposed between the adjacent faces of the base 49 and the pedestal 50 as suggested very clearly in Figure 3. A pair of foot receiving members 52 are arranged on the upper face of the rotatable pedestal 50, so that the person to be measured will assume the proper position on the pedestal. To further permit the proper taking of the measurements, the rotatable pedestal may be marked off for cooperation with a stationary mark placed on the floor or at one edge of the stationary base 49, in a predetermined manner.

The operation of my apparatus may be briefly stated as follows: A portion of paper that constitutes the chart A is unrolled from a suitable roll of paper and is secured to the wall adjacent which the apparatus is located.

The person whose measurements are to be taken occupies the pedestal and then the units 7 and 8 are brought into position for engagement with the respective sides of a human body and by moving these units simultaneously downwardly, the exact outline or configuration and dimension characteristics of the human body will be graphically recorded by the pencils 18 and 46 respectively on the chart. The pedestal can be rotated so that the person occupying the same will be caused to face directly away from the wall or directly to the left or right at the pleasure of the person taking the measurements.

In this manner a record will be produced of the exact outline of the body of the person who is to be fitted with a suit or overcoat or other wearing apparel, and the chart when completed may be submitted to the tailor and the goods may be cut with the aid of the chart of the person for whom the suit is to be made.

By the use of inner and outer marking units, should the body of the person being measured accidentally move or sway, such movement will not disrupt the taking of the proper outline or configuration of the body.

The simplicity of my improved apparatus enables the same to be manufactured and sold at a very low cost and furthermore the parts are arranged so as to enable the same to be readily and easily assembled or disassembled.

Also, a delineating apparatus of this character will, at all times, be positive and efficient in carrying out the purposes for which it is designed.

While I have shown the preferred embodiment of my invention, it is to be understood that various changes in the size, shape and arrangement of parts may be resorted to, without departing from the spirit of the invention or the scope of the appended claims.

Having thus described my invention, what is claimed as new is:

1. In an apparatus for delineating the human body, a pair of units for disposition on opposite sides of the body, body engaging means carried by each unit, a marker carried by each unit, said units being capable of simultaneous movement, and a support on which the movable units are mounted, said support including spaced tracks, the movable units being provided with means for guided movement between the tracks, said tracks being disposed vertically, the upper portions of the tracks being directed laterally, one of the units being adapted for movement along the vertical portions of the tracks, the other unit being adapted for movement along the horizontally disposed tracks.

2. In an apparatus for delineating the human body, a pair of units for disposition on opposite sides of the body, body engaging means carried by each unit, a marker carried by each unit, said units being capable of simultaneous movement, and a support on which the movable units are mounted, said support including spaced tracks, the movable units being provided with means for guided movement between the tracks, said tracks being disposed vertically, the upper portions of the tracks being directed laterally, one of the units being adapted for movement along the vertical portions of the tracks, the other unit being adapted for movement along the horizontally disposed tracks, the unit that is associated with the horizontally disposed tracks including a cross rod operable between said tracks, and an elongated arm connected at one end to the cross rod for swinging movement.

In testimony whereof I affix my signature.

LORIS A. SANTIN.